(12) United States Patent
Agin et al.

(10) Patent No.: US 7,477,912 B2
(45) Date of Patent: *Jan. 13, 2009

(54) METHOD FOR IMPROVING PERFORMANCES OF A MOBILE RADIOCOMMUNICATION SYSTEM USING A POWER CONTROL ALGORITHM

(75) Inventors: Pascal Agin, Sucy En Brie (FR); Rémi de Montgolfier, Paris (FR)

(73) Assignee: ALCATEL, Paris (FR)

( * ) Notice: Subject to any disclaimer, the term of this patent is extended or adjusted under 35 U.S.C. 154(b) by 888 days.

This patent is subject to a terminal disclaimer.

(21) Appl. No.: 10/036,356

(22) Filed: Jan. 7, 2002

(65) Prior Publication Data
US 2002/0058482 A1    May 16, 2002

Related U.S. Application Data

(63) Continuation of application No. 09/348,005, filed on Jul. 6, 1999, now Pat. No. 6,337,973.

(30) Foreign Application Priority Data

Jun. 16, 1999  (EP) .................................. 99401486

(51) Int. Cl.
*H04Q 7/20* (2006.01)
(52) U.S. Cl. .......................... 455/522; 455/69; 455/70; 455/67.11; 370/318; 370/320; 370/335
(58) Field of Classification Search .................. 455/69, 455/70, 67.11, 13.4, 127, 296, 226.3, 343.1, 455/343.2, 422.1, 423, 424, 425, 8, 9, 10, 455/505, 522; 370/318, 320, 335, 317, 342; 375/148, 224–227, 252, 296, 297, 219
See application file for complete search history.

(56) References Cited

U.S. PATENT DOCUMENTS

| | | | | |
|---|---|---|---|---|
| 5,386,589 | A * | 1/1995 | Kanai | 455/423 |
| 5,574,984 | A * | 11/1996 | Reed et al. | 455/69 |
| 5,812,938 | A | 9/1998 | Gilhousen et al. | |
| 5,822,318 | A | 10/1998 | Tiedemann et al. | |
| 5,839,056 | A * | 11/1998 | Hakkinen | 455/69 |
| 5,982,760 | A * | 11/1999 | Chen | 370/335 |
| 6,018,544 | A | 1/2000 | Kotzin et al. | |
| 6,137,789 | A * | 10/2000 | Honkasalo | 370/342 |
| 6,137,840 | A * | 10/2000 | Tiedemann et al. | 375/297 |
| 6,173,162 | B1 * | 1/2001 | Dahlman et al. | 455/69 |
| 6,181,738 | B1 * | 1/2001 | Chheda et al. | 375/224 |
| 6,337,973 | B1 * | 1/2002 | Agin et al. | 455/69 |
| 6,405,052 | B1 * | 6/2002 | Faber | 455/522 |
| 6,549,785 | B1 * | 4/2003 | Agin | 455/522 |
| 6,625,466 | B1 * | 9/2003 | Dicker et al. | 455/522 |

FOREIGN PATENT DOCUMENTS

| | | |
|---|---|---|
| EP | 0 886 389 A2 | 12/1998 |
| WO | WO 97 18643 | 5/1997 |

\* cited by examiner

*Primary Examiner*—Jean A Gelin
(74) *Attorney, Agent, or Firm*—Sughrue Mion, PLLC

(57) ABSTRACT

A method for improving performances of a mobile radiocommunication system using a power control algorithm for controlling a transmit power according to a transmission quality target value, said method comprising, upon the occurrence of a significant change in the required transmit power, bypassing said power control algorithm by changing the transmit power according to a corresponding change in the required transmission quality target value.

17 Claims, 3 Drawing Sheets

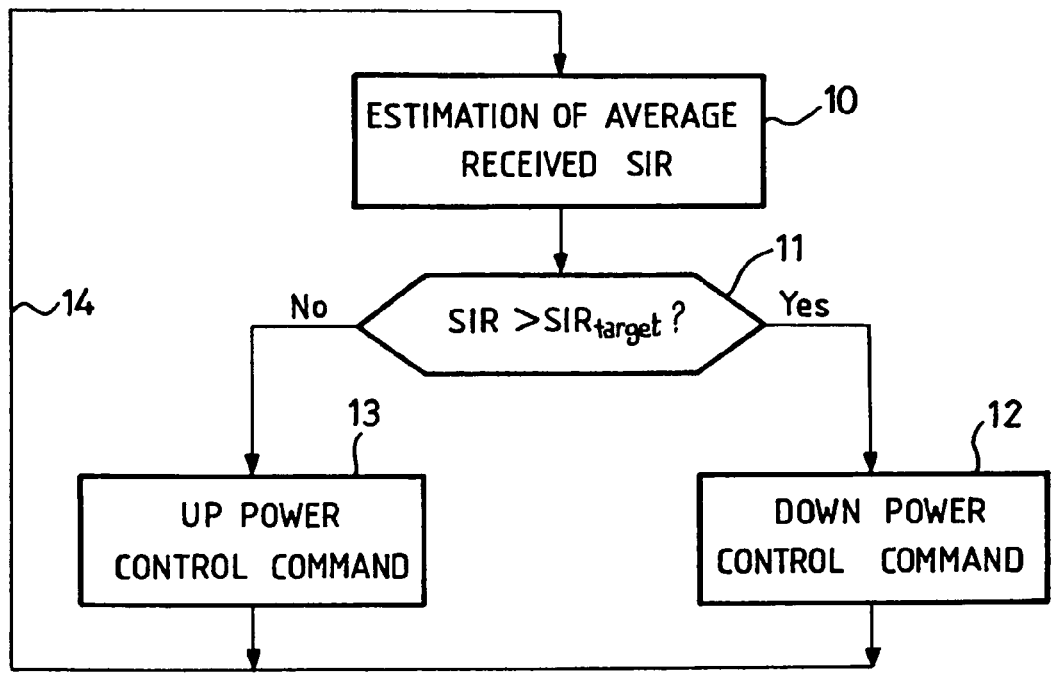
FIG_1 PRIOR ART
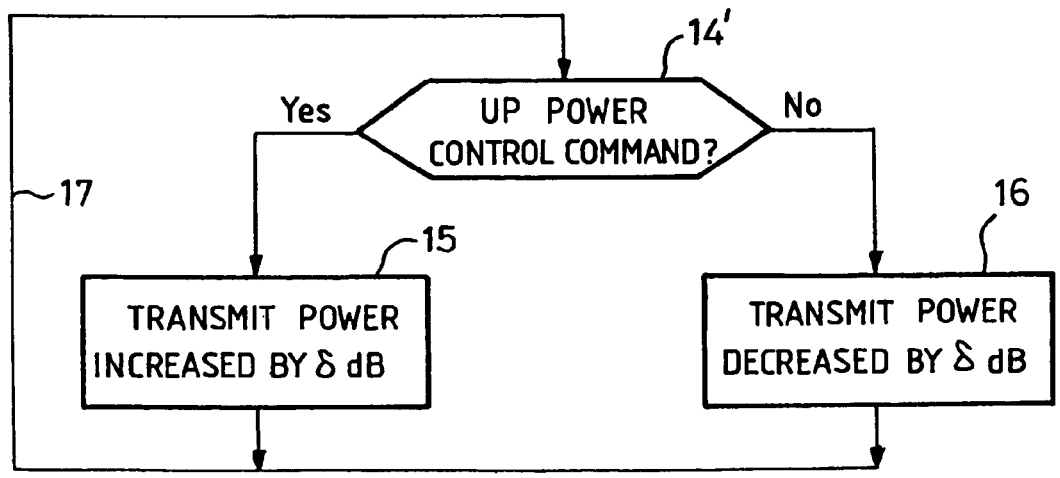
FIG_2 PRIOR ART

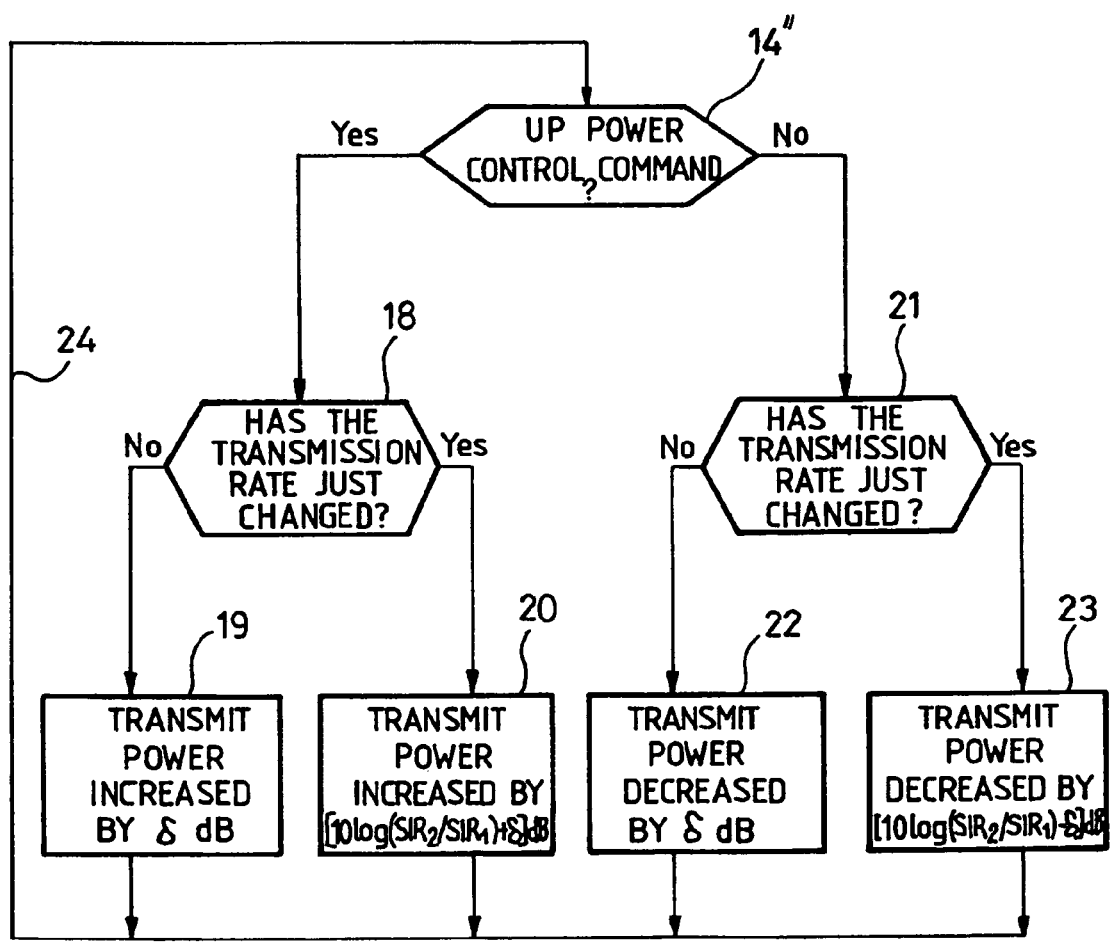

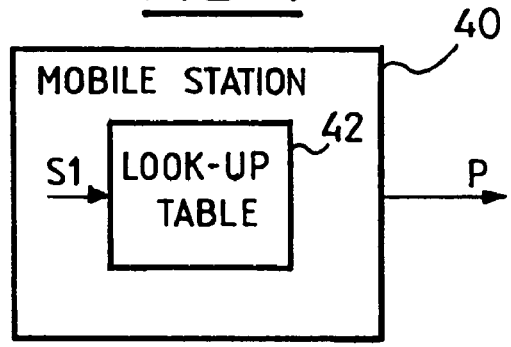
FIG_4
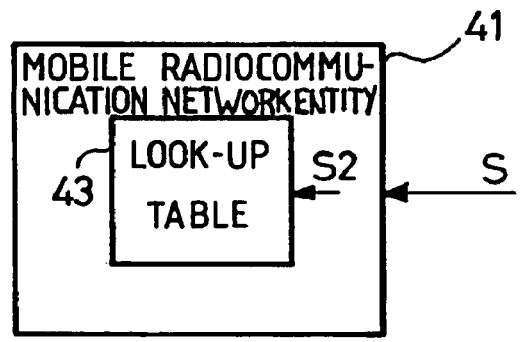
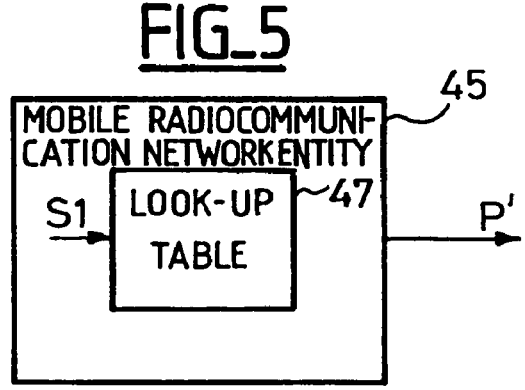
FIG_5
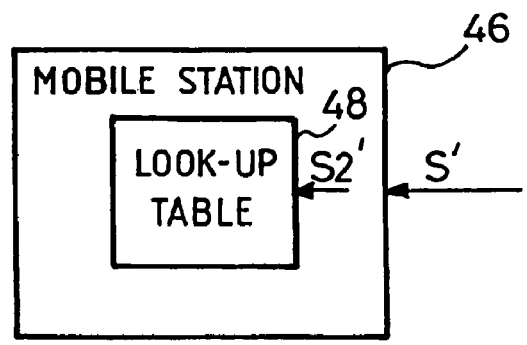

METHOD FOR IMPROVING PERFORMANCES OF A MOBILE RADIOCOMMUNICATION SYSTEM USING A POWER CONTROL ALGORITHM

This is a continuation of application Ser. No. 09/348,005 filed Jul. 6, 1999, now U.S. Pat. No. 6,337,973 the disclosure of which is incorporated herein by reference.

BACKGROUND OF THE INVENTION

The present invention is generally concerned with mobile radiocommunication systems.

The present invention is more particularly concerned with power control techniques used in such systems to improve performances (in terms of quality of service, of capacity, ... etc.).

The present invention is in particular applicable to mobile radiocommunication systems of CDMA ("Code Division Multiple Access") type. In particular, the present invention is applicable to UMTS ("Universal Mobile Telecommunication System").

As is known, CDMA systems use two types of power control techniques, a so-called open-loop power control technique, and a so-called closed loop power control technique (also called hereinafter CLPC). These power control techniques may be recalled for example for the uplink transmission direction, i.e. from MS ("Mobile Station") to BTS ("Base Transceiver Station"). In the open-loop power control, a MS transmit power is controlled based on the power received by this MS from a BTS. In the CLPC, a MS transmit power is controlled based on the transmission quality of the link between this MS and a BTS, as estimated at this BTS.

The transmission quality of a link between a MS and a BTS depends on the ratio of the received signal power and the interference power, also called SIR (Signal-to-Interference Ratio). When the SIR of a MS is low, or equivalently when the powers of the other MSs are much higher than its power, its performances dramatically decrease. The CLPC algorithm enables to keep the SIR of each user as constant as possible.

The principle of the CLPC algorithm is that the BTS periodically estimates the SIR of the received signal from each MS, and compares this estimated SIR to a target SIR ($SIR_{target}$). If the estimated SIR is lower than the target SIR, the BTS sends a power control command to the MS, for the MS to increase its transmit power. Otherwise, the BTS sends a power control command to the MS, for the MS to decrease its transmit power. The target SIR is chosen by the BTS as a function of the required quality of service. The target SIR may itself be adjusted according to a quality of service target value, by a slower loop also called outer loop as opposed to the preceding one called inner loop.

Transmission rate in such systems may be made variable, for various reasons, such as for example:
- use of variable rate services, such as for example data packet services,
- transmission in compressed mode, whereby informations are momentarily transmitted at a rate higher than necessary in order to leave some periods idle for performing other tasks (such as for example radio measurements for handover preparation reasons, in particular inter-frequency handover),
- optimisation of system performances (a reduction in the transmission rate, wherever possible, enabling to improve quality and/or capacity),
- ... etc.

As is known, in CDMA systems the transmission rate may be made variable by spreading the informations to be transmitted with a variable spreading factor. The lower the spreading factor, the higher the transmission rate.

Besides, and as also known, the higher the transmission rate, the higher the required transmit power (for a same quality of service).

However, in a system including a CLPC algorithm of the above-recalled type, it may take a relatively long time to reach the new required power each time there is a change in the transmission rate, for various reasons including in particular the time it takes for the outer loop to adjust the target SIR accordingly, or the fact that the transmit power is adjusted in a stepwise manner by the inner loop.

The CLPC algorithm may also be adapted, to make this time as short as possible. To this end, EP 0 886 389 teaches to change the transmit power in an inverse proportion to the variation of the spreading factor.

SUMMARY OF THE INVENTION

An object of the present invention is to improve such an adaptation of a CLPC algorithm.

In particular, an object of the present invention is not only to reduce the time it takes for the CLPC to reach the new required power, but also to set the new required transmit power to an optimised value.

Optimising the value of the new required transmit power is highly beneficial in such systems; indeed, if the required power is set to a value higher than necessary, there is a needless contribution to interference level in the system, and therefore a needless degracation of the performances of the system; on the other hand if the required power is set to a value lower than necessary, the performances of the ongoing communication will be degraded.

An object of the present invention is therefore a method for improving performances of a mobile radiocommunication system using a power control algorithm for controlling a transmit power according to a transmission quality target value, said method comprising, upon the occurrence of a significant change in the required transmit power, bypassing said power control algorithm by changing the transmit power according to a corresponding change in the required transmission quality target value.

According to another object of this invention, said significant change in the required transmit power includes a change in the transmission rate.

According to another object of this invention, said corresponding change in the required transmission quality target value has a predetermined value.

According to another object of this invention, said predetermined value may be regularly updated.

According to another object of the present invention, said transmission quality is represented by a signal-to-interference ratio.

According to another object of this invention, said mobile radiocommunication system is of CDMA type.

According to another object of this invention, said power control is performed in the uplink transmission direction of said mobile radiocommunication system.

According to another object of this invention, said power control is performed in the downlink transmission direction of said mobile radiocommunication system.

Another object of the present invention is a mobile station comprising, for performing such a method in said uplink transmission direction:

means for bypassing said power control algorithm, by changing the transmit power according to a corresponding change in the required transmission quality target value, upon the occurrence of a significant change in the required transmit power.

According to another object of this invention, such means include a look-up table, containing predetermined values of corresponding changes in the required transmission quality target value, corresponding to different significant changes in the required transmit power.

Another object of the present invention is a mobile radiocommunication network entity comprising, for performing such a method in said uplink transmission direction:
means for correspondingly changing the required transmission quality target value, upon the occurrence of a significant change in the required transmit power.

According to another object of this invention, such means include a look-up table, containing predetermined values of corresponding changes in the required transmission quality target value, corresponding to different significant changes in the required transmit power.

Another object of the present invention is a mobile radiocommunication network entity comprising, for performing such a method in said downlink transmission direction:
means for bypassing said power control algorithm, by changing the transmit power according to a corresponding change in the required transmission quality target value, upon the occurrence of a significant change in the required transmit power.

According to another object of this invention, such means include a look-up table, containing predetermined values of corresponding changes in the required transmission quality target value, corresponding to different significant changes in the required transmit power.

Another object of the present invention is a mobile station comprising, for performing such a method in said downlink transmission direction:
means for correspondingly changing the required transmission quality target value, upon the occurrence of a significant change in the required transmit power.

According to another object of this invention, such means include a look-up table, containing predetermined values of corresponding changes in the required transmission quality target value, corresponding to different significant changes in the required transmit power.

BRIEF DESCRIPTION OF THE DRAWINGS

These and other objects of the present invention will become more apparent from the following description taken in conjunction with the accompanying drawings:

FIG. 1 is a diagram intended to illustrate the different steps of a current CLPC algorithm, as performed at a BTS side, as an example for uplink power control, FIG. 2 is a diagram intended to illustrate the different steps of a current CLPC algorithm, as performed at a MS side, as an example for uplink power control, FIG. 3 is a diagram intended to illustrate the different steps of a CLPC algorithm modified so as to include a method according to the present invention, as performed at a MS side, as an example for uplink power control, FIG. 4 is a diagram intended to illustrate the type of means which may be used in a mobile station and in a mobile radiocommunication network entity (such as in particular BTS) to perform a method according to the present invention, for uplink power control, FIG. 5 is a diagram intended to illustrate the type of means which may be used in a mobile radiocommunication network entity (such as in particular BTS) and in a mobile station, to perform a method according to the present invention, for downlink power control.

DETAILED DESCRIPTION OF THE INVENTION

As recalled in FIG. 1, a current CLPC algorithm comprises the following steps, at the BTS, for each time $t_1$:
At step 10, the BTS estimates the averaged received SIR during a period T,
At step 11, the BTS compares this SIR to a target SIR, $SIR_{target}$,
If $SIR > SIR_{target}$, at step 12 the BTS sends a "down" power control command to the MS, for the MS to decrease its power by $\delta dB$, where $\delta$ is the power control step size of the algorithm,
if $SIR < SIR_{target}$ at step 13 the BTS sends an "up" power control command to the MS, for the MS to increase its power by $\delta dB$.
This is periodically repeated, with a repetition period T, as illustrated by loop 14.

As recalled in FIG. 2, a current CLPC algorithm comprises the following steps, at the MS, for each time $t_1$:
At step 14 the MS determines if a received power control command is an "up" power control command or a "down" power control command:
if the received power control command is an "up" power control command, at step 15 the transmit power is increased by $\delta$ dB,
if the received power control command is a "down" power control command, at step 16 the transmit power is decreased by $\delta$ dB.
This is periodically repeated, with a repetition period T, as illustrated by loop 17.

An example of modification of this CLPC algorithm so as to include a method according to the present invention will be disclosed in the following. It should, however be noted that this example is not limitative and that the invention might as well be applied to other examples of algorithms.

Besides, as an example the following description will be made for the case where said power control is performed in the uplink transmission direction, but it should be noted that the present invention might as well be applied to the case where said power control is performed in the downlink transmission direction.

According to the invention, upon the occurrence of a significant change in the required transmit power, said power control algorithm is bypassed, by changing the transmit power according to a corresponding change in the required transmission quality target value.

As an example, the following description will be made for the case where said significant changes in the transmit power correspond to changes in the transmission rate, but it should also be noted that this example is not limitative and that the present invention might as well be applied to other examples of significant changes in the required transmit power, such as for example a change in the required quality of service (in particular a change in the required service), or a change in environment conditions, in mobile speed, or more generally any factor which may affect the required transmit power, or any combination of a plurality of such factors.

Besides, a significant change in said transmit power should be understood as referring to any case where the time it takes for a CLPC algorithm to reach the new required transmit power would be too long, having regard to the required performances.

In the example of FIG. 3, at the MS:

At step 14" the MS determines if a received power control command is an "up" power control command or a "down" power control command:

if the received power control command is an "up" power control command, at step 18 the MS determines if the transmission rate has just changed:

if the transmission rate has not just changed, at step 19 the transmit power is increased by δ dB, if the transmission rate has just changed, at step 20 the transmit power is increased by $[10 \log(SIR_2/SIR_1)+\delta]$ dB, if the received power control command is a "down" power control command, at step 21 the MS determines if the transmission rate has just changed:

if the transmission rate has not just changed, at step 22 the transmit power is decreased by δ dB, if the transmission rate has just changed, at step 23 the transmit power is increased by $[10\log(SIR_2/SIR_1)-\delta]$ dB, This is periodically repeated, with a repetition period T, as illustrated by loop 24.

In this example, $SIR_2/SIR_1$ represents the corresponding change in the required transmission quality target value, corresponding to a change in the required transmit power (in turn corresponding, for example, to a change in the transmission rate).

Such corresponding changes in the required transmission quality target value, for different significant changes in the required transmit power, may have predetermined values. In particular they may be seen as systems parameters and determined accordingly by the operator of the system; they may also be regularly updated, if necessary, in particular to take into account changes in environment conditions.

FIG. 4 is a diagram intended to illustrate the type of means which may be used in a mobile station, noted 40, and in a mobile radiocommunication network entity (such as in particular BTS), noted 41, to perform a method according to the present invention, for uplink power control.

A mobile station comprises, for performing said method in said uplink transmission direction (and further to other classical means not mentioned here):

means for bypassing said power control algorithm, by changing the transmit power according to a required corresponding change in the transmission quality target value, upon the occurrence of a significant change in the required transmit power.

In the example illustrated in FIG. 4, such means include a look-up table 42, containing said predetermined values, and receiving an address signal S1 generated at the MS side and indicating a change in the required transmit power P (for example a change in the transmission rate).

For more flexibility, the values stored in this look-up table may be communicated to the mobile station by the network, at the beginning of a call or during a call, in particular if they are to be regularly updated, for example on the basis of the quality estimation carried out at the network side.

A mobile radiocommunication network entity, such as in particular BTS, comprises, for performing said method in said uplink transmission direction (and further to other classical means not mentioned here):

means for correspondingly changing the required transmission quality target value, upon the occurrence of a significant change in the required transmit power.

In the example illustrated in FIG. 4, such means include a look-up table 43 containing said predetermined values, and receiving an address signal S2 which may be obtained from informations S received from the MS, either from corresponding signalling informations, or directly from the traffic informations received from the MS (in particular in the case where said changes of required transmit power correspond to changes in the transmission rate).

As already indicated, the present invention also applies to downlink power control.

FIG. 5 is a diagram intended to illustrate the type of means which may be used in a mobile radiocommunication network entity (such as in particular BTS), noted 45, and in a mobile station, noted 46, to perform a method according to the present invention, for downlink power control.

A mobile radiocommunication network entity such as in particular BTS comprises, for performing said method in said downlink transmission direction (and further to other classical means not mentioned here):

means for bypassing said power control algorithm, by changing the transmit power according to a corresponding change in the required transmission quality target value, upon the occurrence of a significant change in the required transmit power.

The values stored in this look-up table may be communicated to the network by the mobile station, at the beginning of a call or during a call, in particular if they are to be regularly updated, for example on the basis of the quality estimation carried out at the mobile station side.

In the example illustrated in FIG. 5, such means include a look-up table 47, containing said predetermined values, and receiving an address signal S1' generated at the BTS side and indicating a change in the required transmit power P' (for example a change in the transmission rate).

A mobile station comprises, for performing said method in said downlink transmission direction (and further to other classical means not mentioned here):

means for correspondingly changing the required transmission quality target value, upon the occurrence of a significant change in the required transmit power.

In the example illustrated in FIG. 5, such means include a look-up table 48, containing said predetermined values, and receiving an address signal S2' which may be obtained from informations S' received from the BTS, either from corresponding signalling informations, or directly from traffic informations (in particular in the case where said changes of required transmit power correspond to changes in the transmission rate).

Besides, the values stored in such look-up tables may be different for uplink and downlink power control.

The invention claimed is:

1. A method for improving performances of a mobile radiocommunication system using a power control algorithm for controlling a transmit power according to a transmission quality target value, said method comprising:

upon receipt of a power control command, determining if a significant change in the required transmit power has just occurred; and if the significant change in the required transmit power has just occurred, changing the transmit power according to a change including a corresponding change in the required transmission quality target value, in addition to a change according to said power control command;

wherein the required transmission quality target value is a signal-to-interference ratio.

2. A method according to claim 1, wherein said significant change in the required transmit power corresponds to the use of transmission in compressed mode.

3. A mobile station for a mobile radiocommunication system using a power control algorithm for controlling a transmit power according to a transmission quality target value, said mobile station comprising:
- means for, upon the reception of a power control command, determining if a significant change in the required transmit power has just occurred; and
- means for, if a significant change in the required transmit power has just occurred, changing the transmit power according to a change including a corresponding change in the required transmission quality target value, in addition to a change according to said power control command;
- wherein the required transmission quality target value is a signal-to-interference ratio.

4. A mobile station according to claim 3, wherein said significant change in the required transmit power corresponds to the use of transmission in compressed mode.

5. A mobile radiocommunication network entity for a mobile radiocommunication system using a power control algorithm for controlling a transmit power according to a transmission quality target value, said mobile radiocommunication network entity comprising:
- means for, upon the reception of a power control command, determining if a significant change in the required transmit power has just occurred; and
- means for, if a significant change in the required transmit power has just occurred, changing the transmit power according to a change including a corresponding change in the required transmission quality target value, in addition to a change according to said power control command;
- wherein the required transmission quality target value is a signal-to-interference ratio.

6. A mobile radiocommunication network entity according to claim 5, wherein said significant change in the required transmit power corresponds to the use of transmission in compressed mode.

7. A mobile radiocommunication system, comprising at least one mobile station according to claim 3.

8. A mobile radiocommunication system, comprising at least one mobile radiocommunication network entity according to claim 5.

9. A mobile station for improving performances of a mobile radiocommunication system using a closed-loop power control algorithm, comprising:
- means for performing one step of changing the transmit power according to a corresponding change in the required transmission quality target value, upon the occurrence of a significant change in the required transmit power;
- wherein said power control is performed in the uplink transmission direction of said mobile radiocommunication system; and
- wherein said means include a look-up table, containing predetermined values of corresponding changes in the required transmission quality target value, corresponding to different significant changes in the required transmit power.

10. A mobile station according to claim 9, further comprising means for receiving values to be stored in said look-up table, said values being communicated by the network.

11. A mobile radiocommunication network entity for improving performances of a mobile radiocommunication system using a closed-loop power control algorithm, comprising:
- means for correspondingly changing the required transmission quality target value, upon the occurrence of a significant change in the required transmit power;
- wherein said power control is performed in the uplink transmission direction of said mobile radiocommunication system; and
- wherein said means include a look-up table, containing predetermined values of corresponding changes in the required transmission quality target value, corresponding to different significant changes in the required transmit power.

12. A mobile station for improving performances of a mobile radiocommunication system using a closed-loop power control algorithm, comprising:
- means for correspondingly changing the required transmission quality target value, upon the occurrence of a significant change in the required transmit power;
- wherein said power control is performed in the uplink transmission direction of said mobile radiocommunication system; and
- wherein said means include a look-up table, containing predetermined values of corresponding changes in the required transmission quality target value, corresponding to different significant changes in the required transmit power.

13. A mobile radiocommunication network entity for improving performances of a mobile radiocommunication system using a closed-loop power control algorithm, comprising:
- means for communicating to mobile stations values to be stored in a look-up table containing predetermined values of corresponding changes in the required transmission quality target value, corresponding to different significant changes in the required transmit power;
- wherein said power control is performed in the uplink transmission direction of said mobile radiocommunication system.

14. A mobile radiocommunication network entity according to claim 13, further comprising means for regularly updating said communicated values, on the basis of a quality estimation carried out at the network side.

15. A mobile radiocommunication network entity for improving performances of a mobile radiocommunication system using a closed-loop power control algorithm, comprising:
- means for performing one step of changing the transmit power according to a corresponding change in the required transmission quality target value, upon the occurrence of a significant change in the required transmit power;
- wherein said power control is performed in the downlink transmission direction of said mobile radiocommunication system; and
- wherein said means include a look-up table, containing predetermined values of corresponding changes in the required transmission quality target value, corresponding to different significant changes in the required transmit power.

16. A mobile radiocommunication network entity according to claim 15, further comprising means for receiving values to be stored in said look-up table, said values being communicated by mobile stations.

17. A mobile station for improving performances of a mobile radiocommunication system using a closed-loop power control algorithm, comprising:

means for communicating to a mobile radiocommunication network entity values to be stored in a look-up table containing predetermined values of corresponding changes in the required transmission quality target value, corresponding to different significant changes in the required transmit power;

wherein said power control is performed in the downlink transmission direction of said mobile radiocommunication system.

* * * * *